United States Patent
Bathiche

(10) Patent No.: US 7,791,598 B2
(45) Date of Patent: Sep. 7, 2010

(54) HYBRID PEN MOUSE USER INPUT DEVICE

(75) Inventor: Steven N. Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 11/651,656

(22) Filed: Jan. 10, 2007

(65) Prior Publication Data

US 2008/0165163 A1   Jul. 10, 2008

(51) Int. Cl.
 *G09G 5/00* (2006.01)
(52) U.S. Cl. .............. 345/179; 345/156; 345/157; 345/163; 178/18.01
(58) Field of Classification Search ......... 345/156–157, 345/179–183; 178/18.01–18.09, 19.01–19.07; 463/37–38
See application file for complete search history.

(56) References Cited

U.S. PATENT DOCUMENTS

| | | | | |
|---|---|---|---|---|
| D305,424 | S | * | 1/1990 | Pressly, Sr. ............... D14/114 |
| 5,063,376 | A | | 11/1991 | Chang ...................... 340/706 |
| 5,764,224 | A | * | 6/1998 | Lilja et al. ................. 345/179 |
| 6,061,051 | A | | 5/2000 | Chan et al. ................ 345/173 |
| 7,023,426 | B1 | | 4/2006 | Robinson .................. 345/169 |
| 7,030,864 | B2 | * | 4/2006 | Yueh ........................ 345/179 |
| 7,068,262 | B2 | * | 6/2006 | Perkins et al. ............. 345/179 |
| 7,333,086 | B2 | * | 2/2008 | Huang et al. ............... 345/156 |
| 2003/0064686 | A1 | | 4/2003 | Thomason et al. .......... 455/90 |
| 2004/0141015 | A1 | | 7/2004 | Fitzmaurice et al. ....... 345/856 |
| 2005/0052406 | A1 | | 3/2005 | Stephanick et al. ........ 345/156 |
| 2005/0088425 | A1 | | 4/2005 | Sun ......................... 345/179 |
| 2006/0164394 | A1 | * | 7/2006 | Tu ........................... 345/166 |
| 2006/0197754 | A1 | | 9/2006 | Keely et al. ............... 345/179 |

FOREIGN PATENT DOCUMENTS

| | | |
|---|---|---|
| GB | 2277577 | 11/1994 |
| WO | WO03060684 | 7/2003 |

OTHER PUBLICATIONS

Magicomm G303 Digital Pen; http://www.magicomm.co.uk/solutions/g303.aspx.

(Continued)

*Primary Examiner*—Lun-Yi Lao
*Assistant Examiner*—Jennifer T Nguyen
(74) *Attorney, Agent, or Firm*—Christopher J. Volkmann; Westman, Champlin & Kelly, P.A.

(57) ABSTRACT

A novel hybrid pointing device combines elements of both a digital pen and a mouse, to collect the advantages of both types of devices in a single user input device. The hybrid input pointing device includes both a digital pen and a cradle. The cradle has a docking bay in which the digital pen can be docked, with an unobstructed path between the electromagnetic tracking signal receptor and a tracking surface on which the cradle is disposed. The electromagnetic signal receptor is enabled to receive tracking signals reflected off the tracking surface from an electromagnetic signal emitter. Information based on the reflected signal may be communicated to a computing device. A user can thereby use the digital pen in a pen-like user scenario, or dock the digital pen in the mouse-like cradle and use the combined device in a mouse-like user scenario.

19 Claims, 5 Drawing Sheets

OTHER PUBLICATIONS

Write On! New digital device links pen and paper to computers, PDSs and Cell Phones; http://otmtech.com/news070402.asp.

Logitech io2 Desktop Cradle—digital pen cradle, http://www.cdw.com/shop/products/default.aspx?EDC=733941 (believed to have been available 2006).

i-Pen—Presentation Digital Pen/Optical Pen Mouse, accessed on Apr. 22, 2010 through Wayback machine (http://web.archive.org/web/20060616101003/ipen4you.com/ipen.htm, dated in Wayback machine Jun. 13, 2006.

I-Pen Ipen Digital Pen Optical USB Mouse Input Mouse Input Device, accessed on Apr. 22, 2010 through Wayback machine (http://web.archive.org/web/20060518001804/http://www.shoptronics.com/iipdiopusbmo.html, dated in Wayback machine May 18, 2006).

* cited by examiner

HYBRID PEN MOUSE USER INPUT DEVICE

BACKGROUND

A variety of different types of computer user input devices have been made for several decades, including mice and digital pens. While mice have become ubiquitous, digital pens have generally not achieved the same widespread utility. Major challenges have stood in the way of digital pens being more useful, including hardware-to-software interaction, hardware implementation, and poor user scenarios. The user scenarios in particular have generally been an awkward intersection of pen-type usage and mouse-type usage.

The discussion above is merely provided for general background information and is not intended to be used as an aid in determining the scope of the claimed subject matter.

SUMMARY

A novel hybrid pointing device combines elements of both a digital pen and a mouse, to collect the advantages of both types of devices in a single user input device. The hybrid input pointing device includes both a digital pen and a cradle. The digital pen includes an electromagnetic signal receptor. The cradle has a docking bay in which the digital pen can be docked. When the digital pen is docked in the cradle, it is oriented toward a tracking surface and has an unobstructed path between the electromagnetic tracking signal receptor and the tracking surface. The cradle is enabled to be moved across a tracking surface on which it is disposed. An electromagnetic signal emitter is included in either the digital pen or the cradle, and configured such that the electromagnetic signal receptor is enabled to receive tracking signals reflected off the tracking surface from the electromagnetic signal emitter. A communication component is included in either the digital pen or the cradle, and enabled to communicate information from the electromagnetic signal receptor to a computing device. A user can thereby use the digital pen in a pen-like user scenario, or dock the digital pen in the mouse-like cradle and use the combined device in a mouse-like user scenario.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figures 1A, 1B:
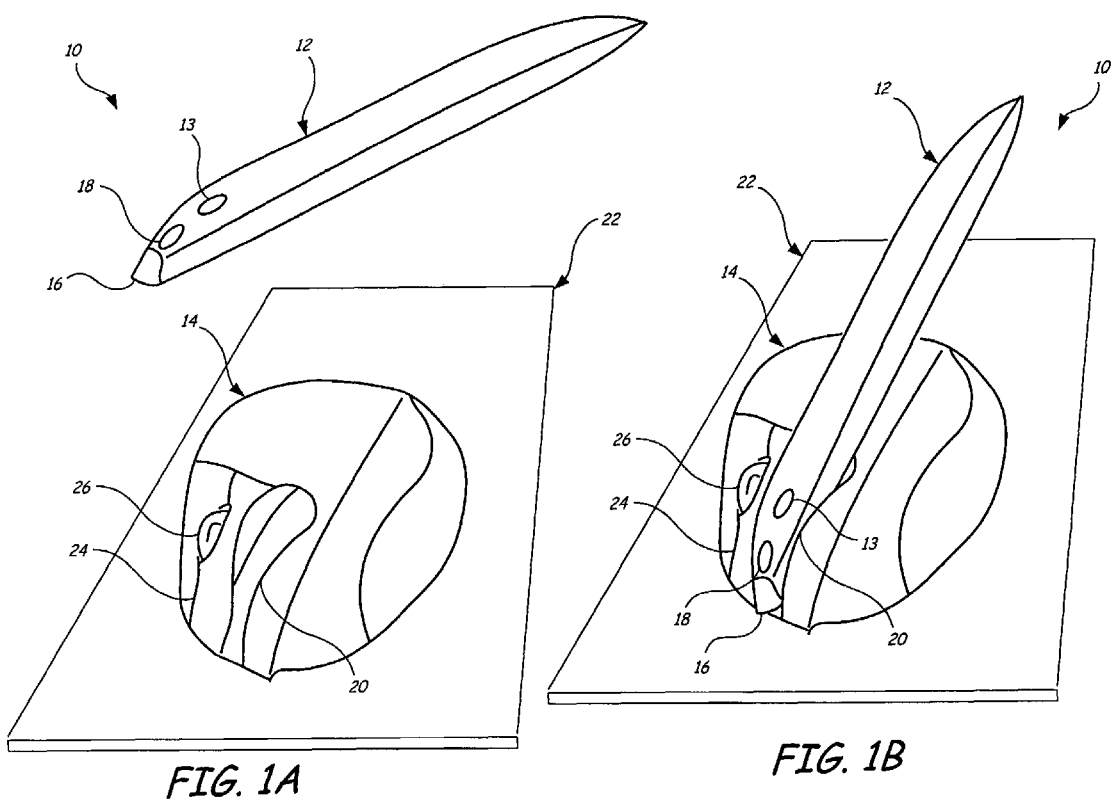
FIGS. 1A and 1B depict a hybrid pointing device, according to an illustrative embodiment.

FIGS. 1A and 1B depict hybrid input device 10, according to one illustrative embodiment that includes digital pen 12 and docking cradle 14. Hybrid input device 10 combines advantages of both a digital pen and a mouse-type input device in a combined device with a single light sensor input, in the form of electromagnetic signal receptor 16, which is included in digital pen 12 but may also be effectively used as a part of cradle 14 in a mouse-type input scenario when digital pen 12 is docked in cradle 14, in this illustrative embodiment. The pointing device form factor may therefore morph from a pen form factor to a mouse form factor, without ever having to actually switch from one position sensor to a separate position sensor.

FIG. 1A depicts digital pen 12 separate from docking cradle 14, while FIG. 1B depicts digital pen 12 engagingly docked in docking bay 20 of docking cradle 14. Digital pen 12 includes an electromagnetic signal receptor 16 at one end, and a laser emitter 18 adjacent to the signal receptor. Laser emitter 18 is one potential type of electromagnetic signal emitter, enabled to emit a laser beam that can reflect off a tracking surface, such as mousepad 22. That can be a surface on which the cradle is disposed or that digital pen 12 is otherwise oriented toward, and which reflects the laser so that electromagnetic signal receptor 16 is enabled to sense the reflection. This includes the capability to sense movement of the reflection, which can be translated into a signal representing the motion of the electromagnetic signal receptor 16, and thereby also, the movement of digital pen 12, as well as of hybrid pointing device 10 when digital pen 12 is docked in docking cradle 14, as in FIG. 1B.

Electromagnetic signal receptor 16 may be particularly configured to image a reflection from a coherent electromagnetic beam reflected from the tracking surface, such as mousepad 22, such as may arise from a laser emitted by laser emitter 18, for example. For example, electromagnetic signal receptor 16 may be configured to image a speckle pattern, so that motion can be tracked by changes in speckle intensity; or electromagnetic signal receptor 16 may be configured to image an interferometric pattern for laser Doppler velocimetry, for example, in addition to other potential imaging techniques. Electromagnetic signal receptor 16 may also be configured to image a visible light signal from a portion of a user output display, such as a plasma display, an LED display, a cathode ray tube display, and other types of user output monitors. Electromagnetic signal receptor 16 may therefore alternately image either a reflection from a tracking laser, or a direct transmission from a display, capturing typical functions of both a mouse and a digital pen.

When digital pen 12 is docked in docking bay 20 of cradle 14, as in FIG. 1B, it is oriented toward mousepad 22 and has an unobstructed path between the electromagnetic signal receptor 16 and the intended position of the mousepad 22. Cradle 14 is enabled to be translatingly moved across mousepad 22, much as a mouse would be.

While laser emitter 18 is disposed on digital pen 12 in the embodiment of hybrid input device 10, a laser emitter may also be disposed in cradle 14 in other embodiments, while still other embodiments may include other types of signal source, such as LED's or other light sources. Similarly, the electromagnetic radiation emitted by laser emitter 18 or a different light signal source may be of any frequency capable of reflecting off of a surface, and may include any visible frequency or set of frequencies, infrared, ultraviolet, or any combination of the above, for example.

Laser emitter 18, or an different type of electromagnetic signal emitter, is configured such that the electromagnetic signal receptor 14 is enabled to receive tracking signals reflected off the tracking surface from the electromagnetic signal emitter. For example, electromagnetic signal receptor 14 may include a complementary metal-oxide-semiconductor (CMOS) imaging array, a charge-coupled device (CCD), or any other type of electromagnetic sensor enabled to track motion and changes in position in the reflection of the electromagnetic signal from the laser emitter 18.

Cradle 14 includes input elements analogous to those commonly found on a mouse, such as button 24 and scroll wheel 26. These input elements may be used just as they are on a mouse, but communicate signals generated by their use to digital pen 12, which may combine them with other input information and transmit them to a separate computing system. In other embodiments, cradle 14 may communicate information from button 24 and scroll wheel 26 to a separate communicative system separately from digital pen 12.

These user input elements may perform a different function based on whether or not digital pen 12 is docked in cradle 14. For example, digital pen 12 may include a single button 13, which may be configured to perform the functions of a primary button, corresponding to the typical left button of a mouse, such as to select something on-screen that the pointer is positioned at, when digital pen 12 is not docked in cradle 14. When digital pen 12 is docked in cradle 14, button 13 may be re-assigned to perform the function of a secondary mouse button, typical of the right button of a mouse, such as to generate a pop-up contextual menu, while the primary button function is performed by the actual left button on cradle 14, i.e. button 24 in the embodiment of FIGS. 1A and 1B, or by a single button housed on cradle 14, in another embodiment. In yet other embodiments, digital pens and cradles may have two or more buttons, scroll wheels, or other user input elements, any of which may assume an altered function depending on whether the digital pen is docked in the cradle or not.

Hybrid pointing device 10 may use any of a variety of mechanisms to detect when digital pen 12 is docked in cradle 14. In one illustrative embodiment, for example, a magnet may be mounted on either digital pen 12 or cradle 14, and a magnetically activated switched mounted on the other of the two bodies at a position adjacent to the position of the magnet, when the digital pen 12 becomes docked in the cradle 14. Other embodiments may use other docking detection means such as an infrared or visible photo emitter and sensor on cradle 14 that become blocked when digital pen 12 becomes docked in cradle 14, or one or more mechanical levers on cradle 14 that become actuated when digital pen 12 is docked in cradle 14, for example.

Figure 2B:
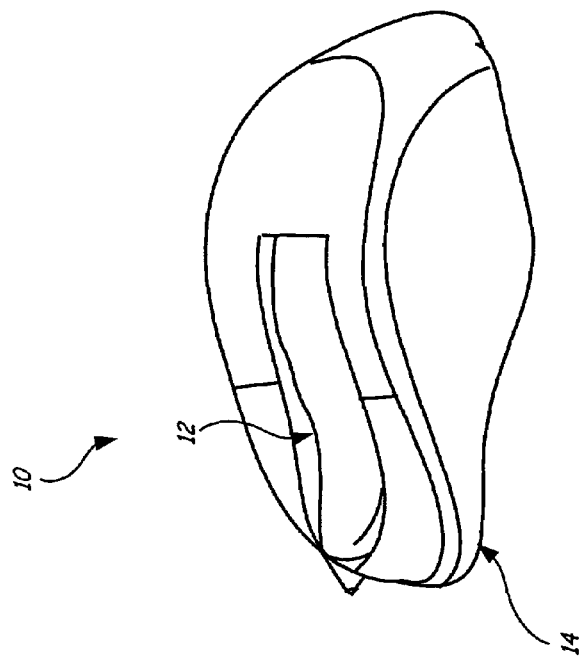
FIGS. 2A and 2B depict a hybrid pointing device, according to another illustrative embodiment.
Figure 2A:
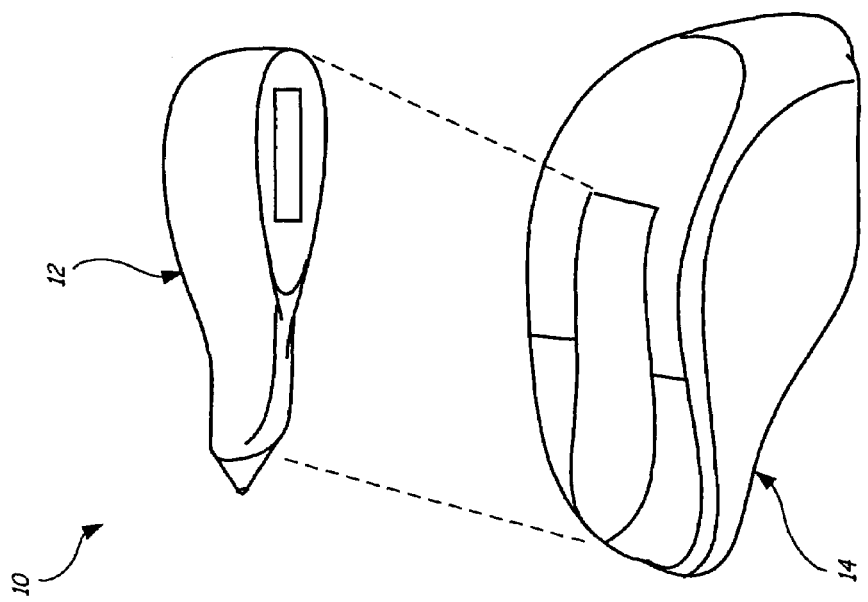

FIGS. 1A and 1B depict one illustrative embodiment of a hybrid input device 10 with a digital pen 12 sized similarly to a standard-sized pen. In contrast, FIGS. 2A and 2B depict a different embodiment of a hybrid input device 40 that features a palm-sized digital pen 42 that fits flush with a cradle 44 so that the combined hybrid input device 40 has a size and profile typical of a mouse form when digital pen 42 is docked with cradle 44. Hybrid input device 10 also includes an electromagnetic signal receptor 44 and other elements similar to the embodiments of FIGS. 1A and 1B and FIG. 3.

Figure 3:
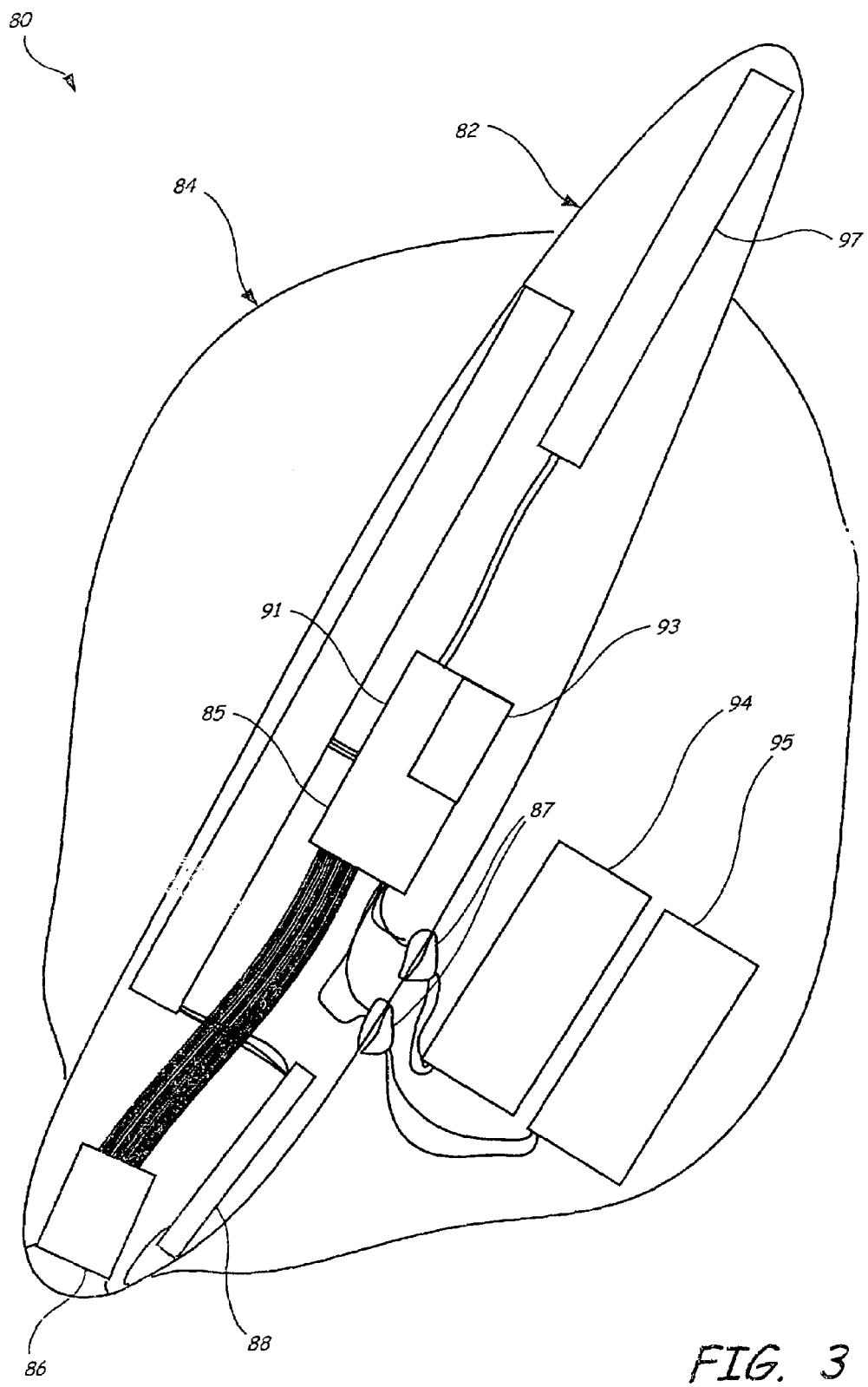
FIG. 3 depicts a hybrid pointing device, according to another illustrative embodiment.

FIG. 3 depicts a schematic block diagram of a hybrid pointing device 80, according to another illustrative embodiment that includes digital pen 82 and cradle 84. Digital pen 82 includes light sensor 86 and laser emitter 88 disposed at a distal end thereof. A battery 85, such as a rechargeable lithium ion battery, for example, provides power to digital pen 82, and to cradle 84 through electrical contacts 87. Cradle 84 also has two buttons, 94 and 95, which are in communicative connection with control circuitry 91 and tracking engine 93. Tracking engine 93 is enabled to track relative motion of a tracking signal received by light sensor 86. Control circuitry 91 and tracking engine 93 are configured to process the information received from light sensor 86 and communicate that information, including information on positioning and motions detected for digital pen 82 by way of light sensor 84, via wireless communication interface 97, to a computing device, such as those in FIGS. 4 and 5. In other embodiments, cradle 84 may include a communication component enabled to communicate with a separate computing device. In such an embodiment, digital pen 82 may communicate with the separate computing device independently, or may communicatively relay information to cradle 84 to be passed on the separate computing device.

Tracking engine 93 may also use different tracking parameters based on whether or not digital pen 82 is docked in cradle 84. For example, tracking engine 93 may be optimized for handwriting when digital pen 82 is undocked, such as by increasing the resources used for precise tracking at slow speeds, while tracking engine 93 may be optimized for a pointing function when digital pen 82 is docked in cradle 84, for example by re-scaling the ratio of tracked speed to pointer speed. Other reassignment of tracking parameters as a function of whether the digital pen is docked in the cradle may be used in other embodiments.

Cradle 84 may be powered by its own small battery, by energy inductively received from depression of buttons or other manual manipulation by a user during ordinary usage, by energy received from digital pen 82, or any combination of these or other sources, in various embodiments. The battery of cradle 84 may be rechargeable from digital pen 82, according to one embodiment.

Digital pen 82 becomes communicatively connected with cradle 84 when it is docked in cradle 84, such as through electrical contacts 87, so that digital pen 82 is configured to receive signals from buttons 94 and 95 comprised in the cradle 84, or from other input elements on cradle 84 such as scroll wheel 26 of FIG. 1. Electrical contacts 87 may also enable energy transfer between digital pen 82 and cradle 84 when digital pen 82 is docked in cradle 84. In other embodiments, digital pen 82 and cradle 84 may not have electrical contacts 87, but may establish power and communication links by another means, such as magnetic charging, for example. In still another embodiment, cradle 84 may be able to power the signal generation of its buttons 94 and 95, a scroll wheel, or other input elements by the kinetic energy of those input elements being manipulated by a user, or elements by the kinetic energy of the cradle 84 itself being moved by a user, for example.

Tracking engine 93 is configured as a relative tracking engine, in this embodiment, although digital pen 82 is also capable of sensing a reflected light signal from up to a maximum height above the reflecting surface that may be much higher than its docked height when docked in cradle 84. The maximum height is still likely to be higher than would be encountered with normal writing-style usage by a user using the digital pen 82 by itself in a pen-style usage mode. Digital pen 82 is enabled to distinguish when it is at a contact distance from the reflecting surface, consistent (within normal tolerances) with being docked in cradle 84 or being held in physical contact with the reflecting surface, and when it is at a significantly higher, hovering height, when it is being held significantly higher than the contact height.

This capability, combined with the relative tracking engine, provides substantial advantages over either a relative tracking engine alone or an absolute tracking engine alone, particularly for application with a desktop computer. For example, it enables a user to write in contact with the reflecting surface, which is tracked and translated into written matter on a user output such as a monitor; and it enables the user to lift the pen a short distance above the reflecting surface, such as between one letter or word to the next, or even to lift the pen marginally to dot a lower case letter "i", for example. Tracking engine 93 then tracks the position of the digital pen projected above the reflecting surface, neglecting any angle of the digital pen to the orthogonal, and resumes translating the motions of the digital pen 82 into written matter on the user output when the digital pen 82 is brought back within the contact distance. In the example of the letter, "i", then, it tracks the translated position of the digital pen 82 between the staff of the "i" to the dot, while omitting translating the digital pen's transit corresponding to the hovering height into written matter, allowing the user to write in a natural manner with digital pen 82.

The maximum hovering height may be in the range of ten to one hundred millimeters above the tracking surface, plus or minus a margin consistent with ordinary manufacturing tolerances, to give some small margin of tolerance at the lower end to small departures from the contact distance, while the maximum height may allow more than a margin of reasonable use for a user lifting the digital pen 82 above the reflecting surface.

In another illustrative embodiment, laser emitter 13 may also be configured to project a virtual display image output onto a tracking surface, to create a virtual display. The virtual display may also be projected by other laser emitters mounted on or contained within either or both of digital pen 12, cradle 14, or other components in communication with a computing system associated with hybrid pointing device 10. The virtual display image projected by the laser emitter 13, or other associated laser emitters, may represent a portion of a larger display image that may be unseen in full but that is tracked in electronic memory, with the portion being projected at any one time dependent on the movements of digital pen 12, which are accounted for so as to cancel out the effects of such movement on the appearance of the virtual display image. The virtual display image may thereby be made to seem to remain unmoving while digital pen 12 is moved over it, and movements of digital pen 12 may seem to illuminate different portions of the larger display image.

A user may then interact with the virtual display image by using digital pen 12 to point to, select, or "click on" objects displayed within the virtual display image on the tracking surface, or "write" on portions of the virtual display image on the tracking surface. In embodiments in which one or more lasers on the cradle 14 participate in projecting the virtual display surface, the relative motion of digital pen 12, and any relative motion between digital pen 12 and cradle 14, may also be accounted for in projecting the virtual display image. These are illustrative of ways in which hybrid pointing device 10 may be configured to receive inputs with reference to the virtual display image.

The lasers used to project the virtual display image may, for example, be emitted by micro-electro-mechanical system (MEMS) or nano-electro-mechanical system (NEMS) scale laser emitters, paired with similarly scaled actuatable mirrors, to manipulate each laser through a projection pattern to create the virtual image. As one illustrative example, a laser projection system with a total volume of approximately five cubic centimeters has been contemplated for inclusion within a digital pen 12 as part of hybrid input device 10. Other embodiments of larger or smaller scales, down to the smallest scales of laser projectors available at a given time, may be used in other embodiments.

In another illustrative embodiment, the laser-projected virtual display image may be used as the primary output display of a computing system, so that a separate display becomes optional, and the hybrid input device 10 comes to serve as the basic output device as well as input device of a mobile computing system. This may also enable hybrid input device 10 to serve by itself as a mobile computing system, particularly when using a wireless connection system to provide network connectivity with other computing systems.

Figure 4:
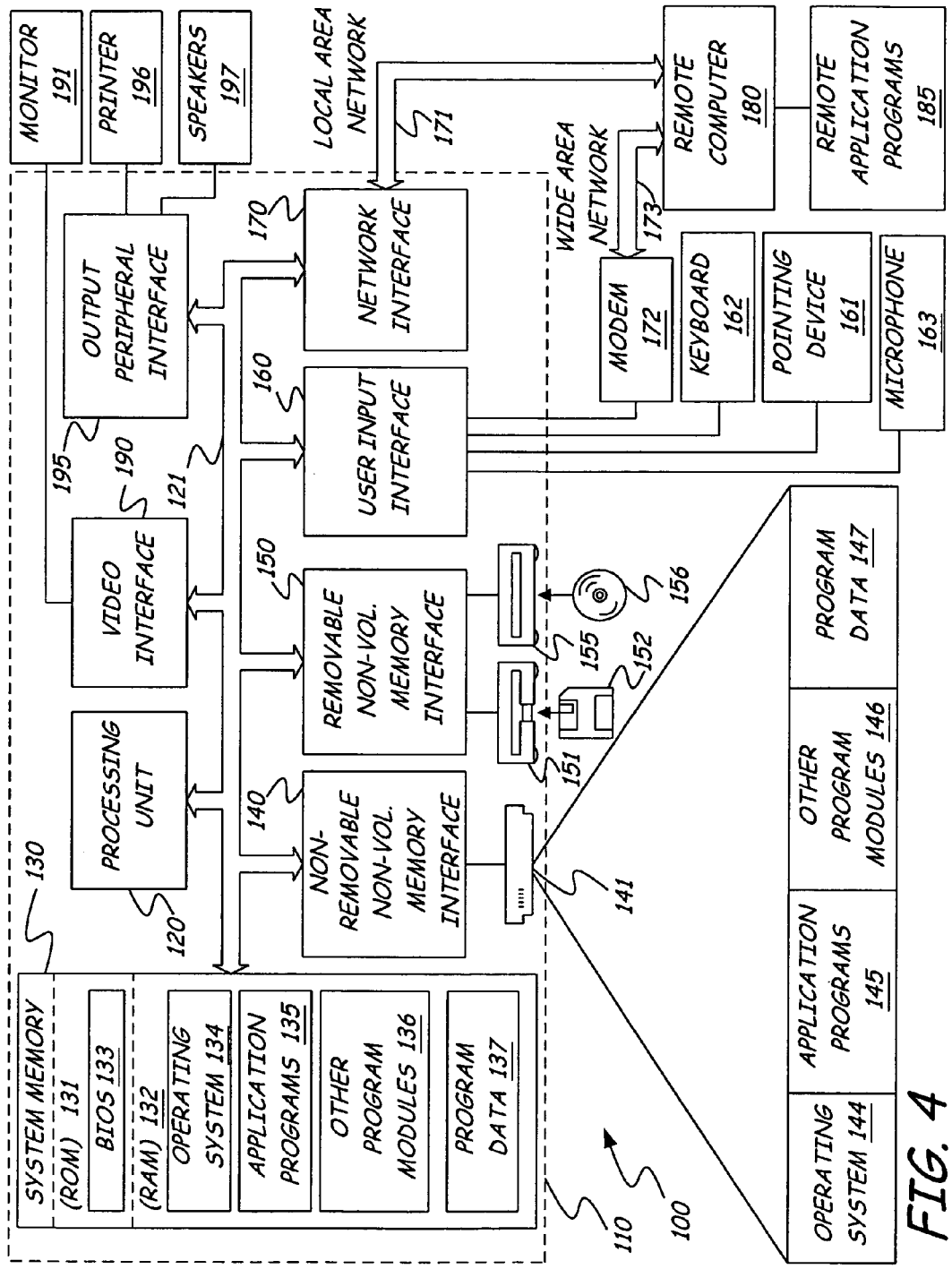
FIG. 4 depicts a block diagram of a computing environment in which some embodiments may be practiced.

FIG. 4 illustrates an example of a suitable computing system environment 100 with which various embodiments may be implemented. Computing system environment 100 as depicted in FIG. 4 is only one example of a suitable computing environment for functioning cooperatively with various embodiments, and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices. As described herein, such executable instructions may be stored on a medium such that they are capable of being read and executed by one or more components of a computing system, thereby configuring the computing system with new capabilities.

With reference to FIG. 4, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can, be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137.

The computer 110 may also include other removable/non-removable volatile/nonvolatile computer storage media. By way of example only, FIG. 4 illustrates a hard disk drive 141 that reads from or writes to non-removable, nonvolatile magnetic media, a magnetic, disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a hybrid pointing device comprising both a digital pen and a cradle, according to a variety of different embodiments. Additional input devices (not shown) that may also be used may include a mouse, trackball, touch pad, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on remote computer 180. It will be appreciated that the network connections shown are exemplary and other means of establishing a communications link between the computers may be used.

Figure 5:
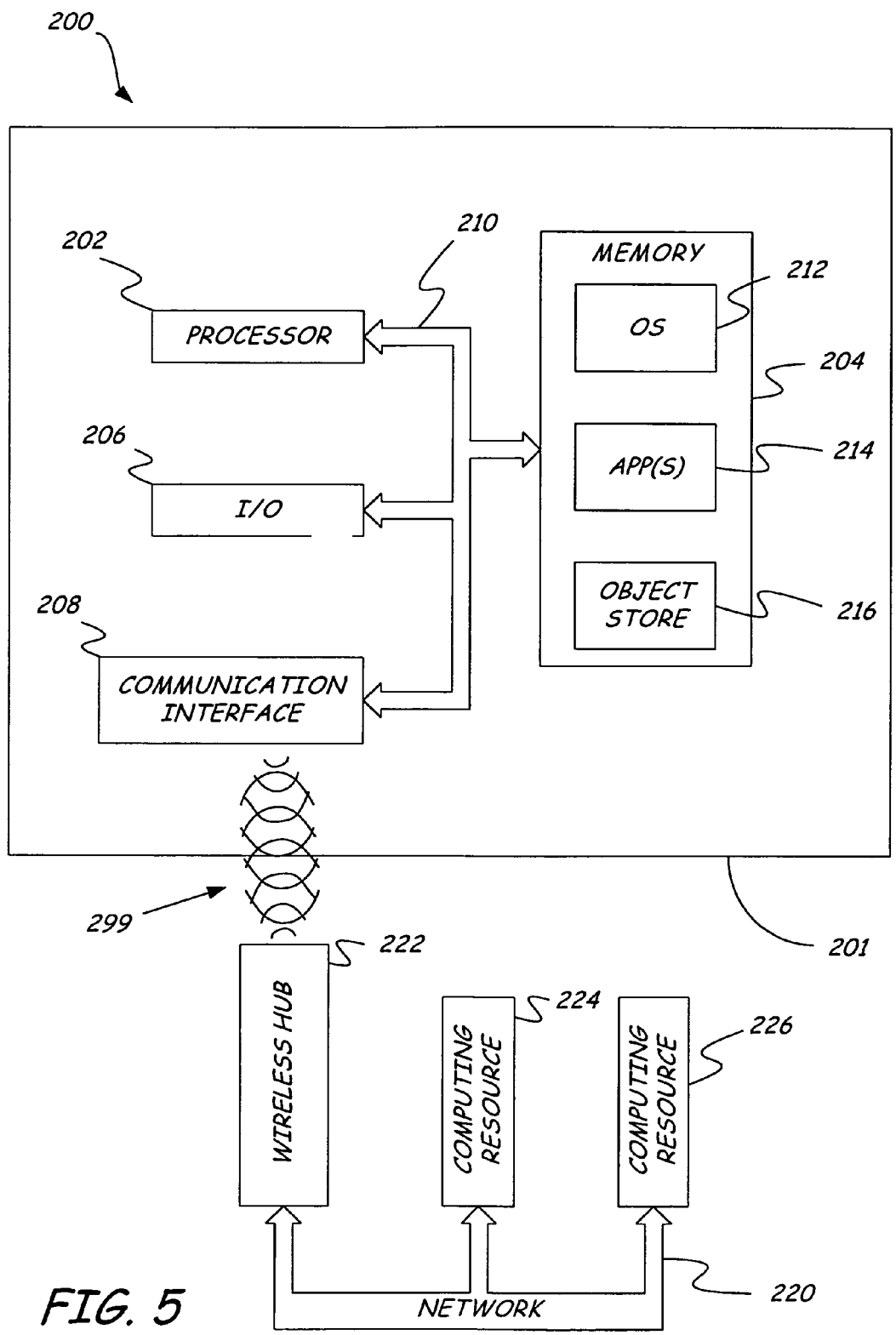
FIG. 5 depicts a block diagram of another computing environment in which some embodiments may be practiced.

FIG. 5 depicts a block diagram of a general mobile computing environment, comprising a mobile computing device and a medium, readable by the mobile computing device and comprising executable instructions that are executable by the mobile computing device, according to another illustrative embodiment. FIG. 5 depicts a block diagram of a mobile computing system 200 including mobile device 201, according to an illustrative embodiment. Mobile device 201 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 may be implemented as non-volatile electronic memory such as random access memory (RAM) with a battery back-up module (not shown) such that information stored in memory 204 is not lost when the general power to mobile device 200 is shut down. A portion of memory 204 is illustratively allocated as addressable memory for program execution, while another portion of memory 204 is illustratively used for storage, such as to simulate storage on a disk drive.

Memory 204 includes an operating system 212, application programs 214 as well as an object store 216. During operation, operating system 212 is illustratively executed by processor 202 from memory 204. Operating system 212, in one illustrative embodiment, is a WINDOWS® CE brand operating system commercially available from Microsoft Corporation. Operating system 212 is illustratively designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Mobile computing system 200 also includes network 220. Mobile computing device 201 is illustratively in wireless communication with network 220—which may be the Internet, a wide area network, or a local area network, for example—by sending and receiving electromagnetic signals 299 of a suitable protocol between communication interface 208 and wireless interface 222. Wireless interface 222 may be a wireless hub or cellular antenna, for example, or any other signal interface. Wireless interface 222 in turn provides access via network 220 to a wide array of additional computing resources, illustratively represented by computing resources 224 and 226. Naturally, any number of computing devices in any locations may be in communicative connection with network 220. Computing device 201 is enabled to make use of executable instructions stored on the media of memory component 204, such as executable instructions that enable computing device 201 to translate an indication of a changing position received from one or more components, such as a digital pen component, of a hybrid pen/mouse pointing device, into a changing position of a pointer on a graphical interface, and other tasks, in a few illustrative embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. As a particular example, while the terms "computer", "computing device", or "computing system" may herein sometimes be used alone for conveniences it is well understood that each of these could refer to any computing device, computing system, computing environment, mobile device, or other information processing component or context, and is not limited to any individual interpretation. As another particular example, while many embodiments are presented with illustrative elements that are widely familiar at the time of filing the patent application, it is envisioned that many new innovations in computing technology will affect elements of different embodiments, in such aspects as user interfaces, user input methods, computing environments, and computing methods, and that the elements defined by the claims may be embodied according to these and other innovative advances while still remaining consistent with and encompassed by the elements defined by the claims herein.

What is claimed is:

1. A device comprising:
   a digital pen, comprising an electromagnetic signal receptor;
   a cradle, enabled to be moved across a tracking surface on which it is disposed;
   an electromagnetic signal emitter, comprised in either the digital pen or the cradle, and configured such that the electromagnetic signal receptor is enabled to receive tracking signals reflected off the tracking surface from the electromagnetic signal emitter; and
   a communication component, comprised in the digital pen, and enabled to communicate information from the electromagnetic signal receptor to a computing device;
   wherein the cradle includes a docking bay in which the digital pen is enabled to be receivingly docked such that the digital pen is oriented toward the tracking surface and has an unobstructed path between the electromagnetic tracking signal receptor and an intended position of the tracking surface: and
   wherein the digital pen becomes communicatively connected with the cradle when it is docked in the cradle such that the cradle is configured to communicate one or more signals to the digital pen.

2. The device of claim 1, wherein the cradle comprises a scroll wheel, and the digital pen is configured to receive signals from the scroll wheel comprised in the cradle.

3. The device of claim 1, further configured to enable energy transfer between the digital pen and the cradle when the digital pen is docked in the cradle.

4. The device of claim 3, further configured to enable the energy transfer between the digital pen and the cradle by inductive charging.

5. The device of claim 3, further configured to enable the energy transfer between the digital pen and the cradle through electrical contacts.

6. The device of claim 1, wherein a user input element comprised in the digital pen performs a different function based on whether or not the digital pen is docked in the cradle.

7. The device of claim 1, wherein the digital pen comprises a tracking engine enabled to track relative motion of the tracking signal.

8. The device of claim 7, wherein the tracking engine is enabled to distinguish between a reflection of the tracking signal from the tracking surface at a contact distance, and a reflection of the tracking signal from the tracking surface at a hovering distance.

9. The device of claim 8, wherein the contact distance is consistent within normal tolerances with the digital pen being either in contact with the tracking surface, or being receivingly docked in the cradle while the cradle is in contact with the tracking surface.

10. The device of claim 8, wherein the hovering distance is between the docked distance and a maximum hovering height.

11. The device of claim 10, wherein the maximum hovering height is in the range of ten to one hundred millimeters above the tracking surface, plus or minus a margin consistent with ordinary manufacturing tolerances.

12. The device of claim 8, wherein the tracking engine controls positioning of a pointer on a computing system display according to the relative positioning of the digital pen at the docked distance or at the hovering distance, and without regard to an angle at which the digital pen is positioned.

13. The device of claim 1, wherein the electromagnetic signal receptor is configured to alternately image a reflection of a coherent electromagnetic beam from the tracking surface, and a visible light signal from a portion of a user output display.

14. The device of claim 1, wherein the cradle comprises a second electromagnetic tracking signal receptor, and the digital pen and the cradle are both enabled to provide information received from their electromagnetic tracking signal receptors to the computing system when the digital pen is not receivingly docked in the cradle.

15. The device of claim 1, wherein the electromagnetic signal emitter is further configured to project a virtual display image, and the device is configured to receive inputs with reference to the virtual display image.

16. A device comprising:
   a digital pen, comprising an electromagnetic signal receptor;
   a cradle, enabled to be moved across a tracking surface on which it is disposed;
   an electromagnetic signal emitter, comprised in either the digital pen or the cradle, and configured such that the electromagnetic signal receptor is enabled to receive tracking signals reflected off the tracking surface from the electromagnetic signal emitter; and
   a communication component, comprised in the digital pen, and enabled to communicate information from the electromagnetic signal receptor to a computing device;
   wherein the cradle includes a docking bay in which the digital pen is enabled to be receivingly docked such that the digital pen is oriented toward the tracking surface and has an unobstructed path between the electromagnetic tracking signal receptor and an intended position of the tracking surface;
   wherein the digital pen becomes communicatively connected with the cradle when it is docked in the cradle; and
   wherein the cradle comprises a button, and the digital pen is configured to receive signals from the button comprised in the cradle.

17. The device of claim 16, wherein the digital pen comprises a tracking engine enabled to track relative motion of the tracking signal, and wherein the tracking engine uses different tracking parameters based on whether or not the digital pen is docked in the cradle.

18. A device comprising:
   a digital pen, comprising an electromagnetic signal receptor;
   a cradle, enabled to be moved across a tracking surface on which it is disposed;
   an electromagnetic signal emitter, comprised in either the digital pen or the cradle, and configured such that the electromagnetic signal receptor is enabled to receive tracking signals reflected off the tracking surface from the electromagnetic signal emitter; and
   a communication component, comprised in either the digital pen or the cradle, and enabled to communicate information from the electromagnetic signal receptor to a computing device;
   wherein the cradle includes a docking bay in which the digital pen is enabled to be receivingly docked such that the digital pen is oriented toward the tracking surface and has an unobstructed path between the electromagnetic tracking signal receptor and an intended position of the tracking surface;
   wherein the digital pen comprises a tracking engine enabled to track relative motion of the tracking signal; and
   wherein the tracking engine uses different tracking parameters based on whether or not the digital pen is docked in the cradle.

19. The device of claim 18, wherein the communication component is comprised in the digital pen, and the digital pen becomes communicatively connected with the cradle when it is docked in the cradle.

* * * * *